(12) United States Patent
Sampathkumar et al.

(10) Patent No.: US 9,977,626 B2
(45) Date of Patent: May 22, 2018

(54) IMPLEMENTING SCATTERED ATOMIC I/O WRITES

(71) Applicant: Seagate Technology LLC, Cupertino, CA (US)

(72) Inventors: Kishore Sampathkumar, Karnataka (IN); Penchala Narasimha reddy Chilakala, Andhra Pradesh (IN); Parag R. Maharana, Dublin, CA (US); Durga Prasad Bhattarai, Karnataka (IN)

(73) Assignee: Seagate Technology LLC, Cupertino, CA (US)

( * ) Notice: Subject to any disclaimer, the term of this patent is extended or adjusted under 35 U.S.C. 154(b) by 21 days.

(21) Appl. No.: 15/198,753

(22) Filed: Jun. 30, 2016

(65) Prior Publication Data

US 2018/0004454 A1    Jan. 4, 2018

(51) Int. Cl.
*G06F 12/00*    (2006.01)
*G06F 3/06*    (2006.01)
*G06F 13/00*    (2006.01)
*G06F 13/28*    (2006.01)

(52) U.S. Cl.
CPC .......... *G06F 3/0659* (2013.01); *G06F 3/061* (2013.01); *G06F 3/0616* (2013.01); *G06F 3/0676* (2013.01); *G06F 3/0679* (2013.01); *G06F 2003/0691* (2013.01)

(58) Field of Classification Search
CPC .... G06F 3/0616; G06F 3/0656; G06F 3/0674; G06F 2003/0691
See application file for complete search history.

(56) References Cited

U.S. PATENT DOCUMENTS

| | | |
|---|---|---|
| 5,701,501 A | 12/1997 | Gandhi |
| 8,782,327 B1 | 7/2014 | Kang et al. |
| 9,170,938 B1 | 10/2015 | Walsh et al. |
| 9,218,279 B2 | 12/2015 | Tomlin et al. |
| 2008/0320245 A1 | 12/2008 | Tomlin et al. |
| 2013/0198447 A1* | 8/2013 | Yochai ................ G06F 12/0866 711/113 |
| 2013/0227236 A1 | 8/2013 | Flynn et al. |
| 2014/0325125 A1 | 10/2014 | Kwon et al. |

* cited by examiner

*Primary Examiner* — Mark A Giardino, Jr.
(74) *Attorney, Agent, or Firm* — Taylor English Duma LLP

(57) ABSTRACT

Methods, systems, and computer-readable storage media for performing scattered atomic I/O writes in a storage device. A list of block I/O write requests to be completed as an atomic unit is received from a requester with at least two of the block I/O write requests specifying non-contiguous data locations on a storage media. The plurality of block I/O write requests are buffered in a write buffer with each buffer entry marked as having an invalid state, wherein marking a buffer entry as having an invalid state prevents it from being flushed to the storage media. Upon buffering all of the plurality of block I/O writes, all of the buffer entries are marked as having a valid state at the same time. Upon marking all of the buffer entries as having a valid state, successful completion of the list of block I/O write requests is acknowledged to the requester.

19 Claims, 6 Drawing Sheets

IMPLEMENTING SCATTERED ATOMIC I/O WRITES

BRIEF SUMMARY

The present disclosure relates to technologies for performing scattered atomic I/O writes in a storage device. The technologies may be implemented in a storage device, such as an HDD, SSD, or SSHD device, to address applications requiring processing of multiple, scattered writes in a single atomic operation, such as a database application. According to some embodiments, a method for performing a scattered atomic I/O write in a storage device comprises receiving a list of block I/O write requests to be completed as an atomic unit from a requester, the list of block I/O write requests specifying a plurality of block I/O writes with at least two of the plurality of block I/O writes specifying discontiguous data locations on a storage media. Each of the plurality of block I/O writes is buffered in a write buffer and the buffer entry corresponding to each of the plurality of block I/O writes is marked as having an invalid state, wherein marking a buffer entry as having an invalid state prevents it from being flushed to the storage media. Upon buffering all of the plurality of block I/O writes, the buffer entries corresponding to each of the plurality of block I/O writes are marked as having a valid state, wherein marking a buffer entry as having a valid state makes it eligible to be flushed to the storage media. Upon marking the buffer entries corresponding to each of the plurality of block I/O writes as having a valid state, successful completion of the list of block I/O write requests is acknowledged to the requester.

According to further embodiments, a computer-readable medium comprises processor-executable instructions that cause a processor operably connected to a storage device to receive a list of block I/O write requests to be completed as an atomic unit from a requester, wherein the list of block I/O write requests specifies a plurality of block I/O writes with at least two of the plurality of block I/O writes specifying discontiguous data locations on a storage media of the storage device. Atomic linkage identifiers are generated for each of the plurality of block I/O writes associating the block I/O write with the list of block I/O write requests, and each of the plurality of block I/O writes with the generated atomic linkage identifiers is submitted to a controller of the storage device. Upon receiving completion of the last of the submitted block I/O writes from the controller, it is determined whether any of the submitted block I/O writes were completed by the controller with an error. If any of the submitted block I/O writes were completed by the controller with an error, the processor completes the list of block I/O write requests to the requester with an error. If all of the submitted block I/O writes were completed by the controller successfully, the processor acknowledges successful completion of the list of block I/O write requests to the requester.

According to further embodiments, a system comprises a storage device comprising storage media, a write buffer for temporarily storing block I/O write requests received for the storage device before flushing to the storage medium, and a controller for processing the block I/O write requests. The controller is configured to receive a block I/O write request and determine whether the block I/O write request is associated with a list of block I/O write requests to be completed as an atomic unit based on atomic linkage identifiers associated with the block I/O write request. The block I/O write request is buffered in the write buffer while the buffer entry corresponding to the block I/O write request is marked as having an invalid state, wherein marking a buffer entry as having an invalid state prevents it from being flushed to the storage media. Upon buffering the last of the block I/O write requests associated with the list of block I/O write requests based on the atomic linkage identifiers, the controller marks the buffer entries associated with the list of block I/O write requests as having a valid state at the same time, wherein marking a buffer entry as having a valid state causes the associated block I/O write requests to be eligible to be flushed to the storage media.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
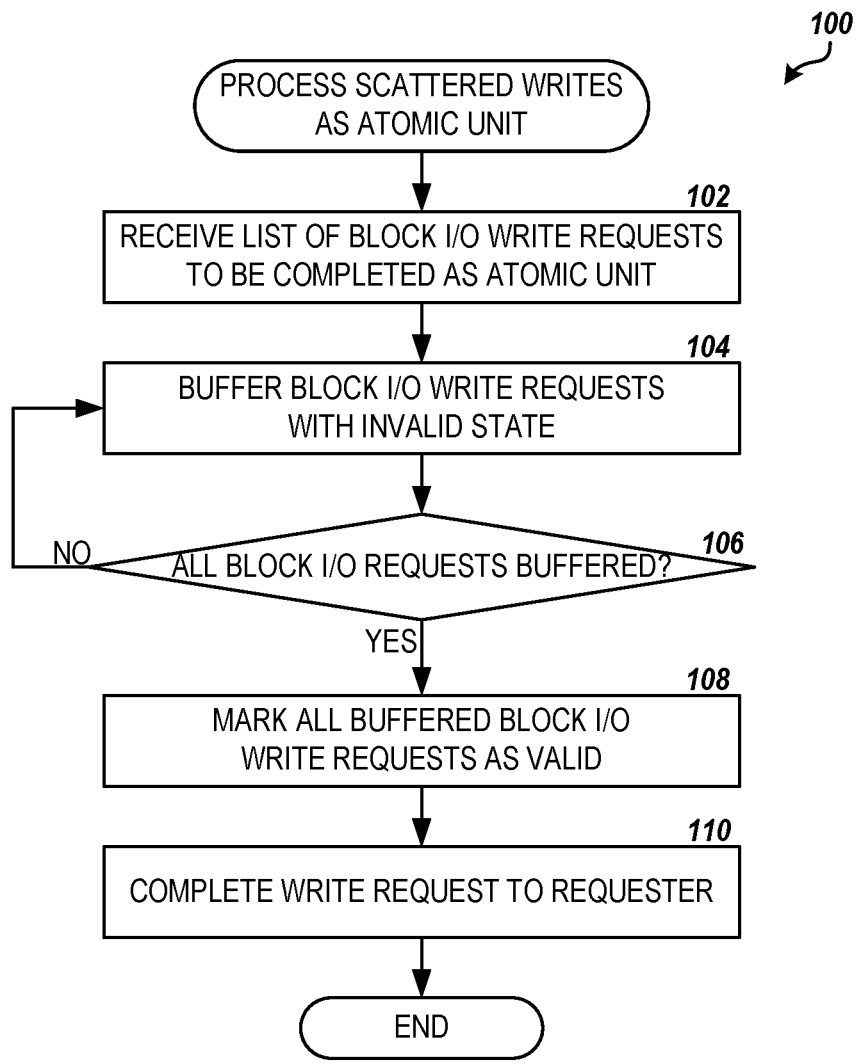
FIG. 1 is a flow diagram showing one method of for performing scattered atomic I/O writes in a storage device, according to embodiments described herein.

The following detailed description is directed to technologies for implementing scattered atomic I/O writes in a storage device, such as a solid-state disk ("SSD") device, hard-disk drive ("HDD") device, or solid-state hybrid disk ("SSHD") device. Many storage devices support atomicity for a single I/O write command to a contiguous range of blocks on the storage medium. For example, many flash controllers implemented in SSD devices support single I/O write atomicity. In addition, small computer system interface ("SCSI") standards have been approved for single atomic write requests. However, atomicity for single atomic writes does not allow optimized I/O performance for some application scenarios where atomicity is required across multiple, scattered (also referred to herein as "discontiguous") writes, such as a transaction write by a database application hitting multiple tables. In these instances, the database application may be required to buffer writes internally to guarantee integrity across the transaction in addition to any buffering performed by the storage devices. This double buffering can significantly reduce application performance.

For example, a MySQL database utilizing the ext4 or XFS file system issues writes to data files from its buffer pool in units of pages, typically 16 KB in size. To flush a 16 KB buffer page, MySQL issues a write( ) system call for 16 KB direct I/O (i.e., opens files with the "O_DIRECT" flag). However, the default size (as well as the maximum size) of each file-system block in these filesystems is 4 KB. Eliminating the double write buffering in MySQL requires ensuring atomicity of 16 KB page writes issued by the MySQL server. Since this in-turn is made up of N=4 possibly discontiguous 4 KB file-system blocks, the filesystem (ext4 or XFS) cannot itself guarantee atomicity without scattered atomic write support from the underlying storage device.

According to embodiments described herein, a method of performing a group of related block I/O writes to a storage device may be implemented such that atomicity is guaranteed across multiple writes to discontiguous blocks on the storage device. The method leverages the single I/O write atomicity capability of the storage device to perform the writes as a single atomic unit, eliminating the need for double buffering and providing considerable I/O performance boost to applications requiring scattered I/O write atomicity. In addition, utilizing the describe method may improve endurance of the storage media in SSD devices. According to some embodiments, the method may be implemented in the firmware of the storage device and/or an associated block I/O device driver implemented on the connected host computer or server. Additional changes and extensions may be implemented in the I/O framework above the device driver, such as in the Linux kernel block layer and/or in the application I/O interface layer, in order to allow an application or OS to specify that a group of related writes are to be performed as an atomic unit.

FIG. 1 illustrates one routine 100 for performing multiple, scattered writes to a storage device in a single atomic operation, according to some embodiments. The routine 100 may be performed when processing block I/O write requests from a database server or other host computer executing an application requiring scattered I/O write atomicity in the storage device. According to some embodiments, the routine 100 may be performed by a controller of the storage device and/or an associated device driver on the host computer. The routine 100 begins at step 102, where a list of block I/O write requests to be completed as an atomic unit is received by the device driver, according to some embodiments. Each block I/O write request may be a direct I/O request (e.g., targeting a file open with the "O_DIRECT" flag), bypassing the file system of the OS and any associated read or write caching. In addition, the target addresses of the block I/O write requests may represent non-contiguous blocks on the storage device. In some embodiments, the requester may further set an indicator for each block I/O write request in the list that indicates the block I/O write requests are to be executed as an atomic unit.

The device driver may maintain "atomic linkage identifiers" for the received list of block I/O write requests, according to some embodiments. For example, the device driver may create a tracking structure for the list of block I/O write requests and assign each block I/O write request a common submission ID and an individual command index, as is described in more detail herein. The driver may further utilize the tracking structure to track the submission of each block I/O write request in the list to ensure that the request is only completed to the requester when all of the individual block I/O write requests have been completed successfully. The device driver may then submit each block I/O write request in the list to the controller of the storage device for execution. According to embodiments, the driver further submits the atomic linkage identifiers with each block I/O write request to the controller.

Next, at step 104, the controller of the storage device buffers the individual block I/O write requests in a buffer, such as a write cache. According to embodiments, the controller may recognize those block I/O write requests to be executed as an atomic unit based on the atomic linkage identifiers submitted therewith, e.g., all block I/O write requests with a common submission ID value. The controller may also create a tracking structure for each submission ID in order to track the status of all block I/O write requests that are part of the atomic unit, as is described in more detail herein. According to some embodiments, the controller will mark all of the buffer entries for the block I/O write requests that are part of the atomic unit as invalid. In this way, the writes will not be flushed from the buffer and to the storage media but will remain in the buffer. The controller may further complete each individual block I/O write request to the device driver once the request is buffered, and the driver will update the tracking structure accordingly.

As indicated at step 106, the controller will continue to buffer the block I/O write requests that are part of the same atomic unit (e.g., having the same submission ID value) and mark them as invalid until the last block I/O write request in the atomic unit has been buffered. The controller may utilize its tracking structure to determine when the last block I/O write request for the submission ID value has been buffered, for example. Once the last block I/O write request for the atomic unit has been buffered, the routine 100 proceeds to step 108 where the controller traverses through the buffer entries for the block I/O write requests and marks them all as valid, allowing the write requests to be flushed to the storage media.

Because the storage device has the capability of guaranteeing atomicity for each of the individual block I/O write requests, and because all of the block I/O write requests for the atomic unit are placed in the write buffer before being flushed, the entire atomic unit will be written to the storage media together as desired. Accordingly, when the device driver receives the successful completion of all of the block I/O write requests from the controller, the routine 100 proceeds to step 110 and the driver completes the request successfully to the requester. If any of the block I/O write requests in the list are completed with an error by the controller, then the entire request is completed with an error to the requester. From step 110, the routine 100 ends.

In the case of an error, those block I/O write requests already buffered by the controller will remain in an invalid state and will not be flushed to the storage media. The invalid buffer entries may be cleaned up by the controller in the course of the normal routine and/or during recovery from intermediate errors or power failures, according to some embodiments. For example, if a power failure occurs in the middle of processing block I/O write requests in an atomic unit, when the storage device spins back up after the power failure, any buffer entries in the buffer with an invalid state will not be eligible to be flushed to the storage media. In this case, the complete chain of invalid buffer entries may be discarded as part of the recovery from power failure.

Figure 2:
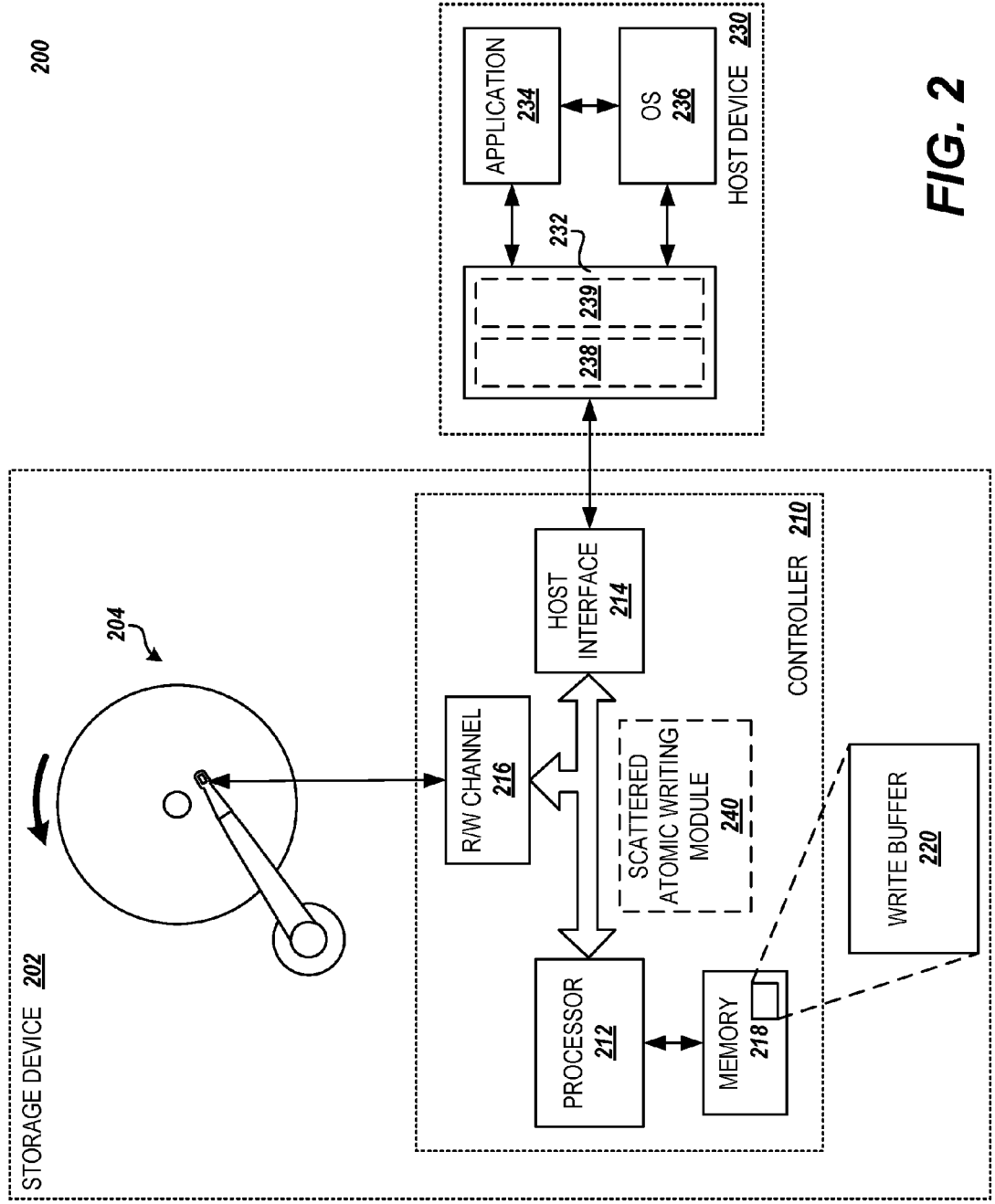
FIG. 2 is a block diagram showing one illustrative environment for the implementation of the embodiments described herein.

FIG. 2 and the following description are intended to provide a general description of a suitable environment 200 in which the embodiments described herein may be implemented. In particular, FIG. 2 shows an illustrative storage device 202, such as an HDD device, along with hardware, software and components for performing multiple, scattered I/O writes in an atomic fashion, according to the embodiments provided herein. According to embodiments, the storage device 202 includes storage media 204 on which data is stored in a non-volatile fashion. For example, the storage media 204 may comprise one or more rotatable disks or platters having magnetic recording surfaces and associated read/write heads for writing data to and reading data from the magnetic surfaces. In other embodiments, the storage media 204 may comprise solid-state memory, optical storage media, magnetic storage media, and/or any combination of these and other storage technologies.

The storage device 202 may further include a controller 210 that controls the operations of the storage device. The controller 210 may include a processor 212. The processor 212 may implement a host interface 214 allowing the storage device 202 to communicate with a host device 230, such as a server computer, personal computer ("PC"), laptop, notebook, tablet, game console, set-top box or any other electronics device that can be communicatively coupled to the storage device 202 to store and retrieve data from the storage device. The processor 212 may process write commands received through the host interface 214 from the host device 230 by formatting the associated data and transferring the formatted data via a read/write channel 216 to the storage media 204. The read/write channel 216 may convert data between the digital signals processed by the processor 212 and the read and write signals necessary for management of the storage media 204. The processor 212 may further process read commands from the host device by determining the location(s) of the desired data on the storage media 204, reading the data from the determined location(s) via the read/write channel 216, correcting any errors, and formatting the data for transfer to the host device 230.

The host interface 214 may comprise a serial AT attachment ("SATA") interface, a serial attached SCSI ("SAS") interface, or the like. In some embodiments, the controller 210 and the host interface 214 present a block I/O device, in which the host device uses logical block addresses ("LBAs") for specifying the target locations for read and write commands by the host device 230. The logical block addresses may represent blocks of data stored in the storage device 202 of a fixed size, such as 512B or 4 KB, and may be translated to storage location(s) on the storage media 204 by the controller 210.

The host device 230 may include a device driver 232 allowing applications 234 and/or an OS executing on the host device 230 to interface with the storage device 202. The device driver 232 may represent processor-executable instruction and/or digital logic implemented in software, hardware, or a combination of the two. The device driver 232 may be stored in a memory of the host device 230, for example. In some circumstances, applications 234 may execute I/O commands through an abstraction provided by the OS 236, such as a file system, and the OS interfaces with the storage device 202 through the device driver 232. In other circumstances, applications 234 may interface directly with the device driver 232 and/or through the host interface 214 to execute I/O commands. This is referred to herein as "direct I/O." For example, a database application 234, such as the MySQL open-source relational database management system ("RDBMS"), may utilize direct I/O for storage related commands, bypassing the OS 236 and any associated abstraction layers and/or caching.

In some embodiments, the device driver 232 may comprise multiple logical layers, such as a device-specific layer 238 associated with the storage device 202 and a generic layer 239 providing the interface for the applications 234 and/or OS, such as the Linux kernel block layer in the Linux operating system. According to further embodiments, the device driver 232 may execute some or all of the steps of the routines 100 and 500 described herein for implementing scattered atomic I/O writes in the storage device 202, as described herein in regard to FIGS. 1 and 5.

The controller 210 may further include a computer-readable storage medium or "memory" 230 for storing processor-executable instructions, data structures and other information. The memory 218 may comprise a non-volatile memory, such as read-only memory ("ROM") and/or FLASH memory. The memory 218 may further comprise a volatile random-access memory ("RAM"), such as dynamic random access memory ("DRAM") or synchronous dynamic random access memory ("SDRAM"). For example, the memory 218 may store a firmware that comprises commands and data necessary for performing the operations of the storage device 202. According to some embodiments, the memory 218 may store processor-executable instructions that, when executed by the processor 212, perform some or all of the steps of the routines 100 and 800 described herein for implementing scattered atomic I/O writes in the storage device 202, as described in regard to FIGS. 1 and 8.

In some embodiments, the memory 218 may include a write buffer 220. The processor 212 may temporarily store block I/O write requests received from the host device 230 in the write buffer 220 until the data contained therein may be written to the storage media 204. The write buffer 220 may be implemented in DRAM and/or FLASH of the controller, for example. In further embodiments, the memory 218 may store other data structures necessary for performing multiple, scattered I/O writes in an atomic fashion, as described herein.

In addition to the memory 218, the environment 200 may include other computer-readable media storing program modules, data structures, and other data described herein for performing multiple, scattered I/O writes in an atomic fashion. It will be appreciated by those skilled in the art that computer-readable media can be any available media that may be accessed by the controller 210, host device 230, or other computing system for the non-transitory storage of information. Computer-readable media includes volatile and non-volatile, removable and non-removable storage media implemented in any method or technology, including, but not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

In further embodiments, the environment 200 may include a scattered atomic writing module 240. The scattered atomic writing module 240 may handles aspects of performing multiple, scattered I/O writes in an atomic fashion, as described herein. According to some embodiments, the scattered atomic writing module 240 may be implemented in the controller 210 as software, hardware, or any combination of the two. For example, the scattered atomic writing module 240 may be stored in the memory 218 as part of the firmware of the storage device 202 and may be executed by the processor 212 for performing the methods and processes described herein. The scattered atomic writing module 240 may alternatively or additionally be stored in other computer-readable media accessible by the controller 210. In further embodiments, the scattered atomic writing module 240 may be implemented in a computing system external to and operably connected to the storage device 202, such as a cluster controller connected to a number of "dumb" disk drives or in the device driver 232 of the host device 230 connected to storage device 202 through the host interface 214, for example.

It will be appreciated that the structure and/or functionality of the storage device 202 and host device 230 may be different that that illustrated in FIG. 2 and described herein. For example, the processor 212, read/write channel 216, memory 218 and other components and circuitry of the storage device 202 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the environment 200 may not include all of the components shown in FIG. 2, may include other components that are not explicitly shown in FIG. 2 or may include storage devices, host devices, and other computing devices utilizing architectures completely different than those shown in FIG. 2.

Figure 3:
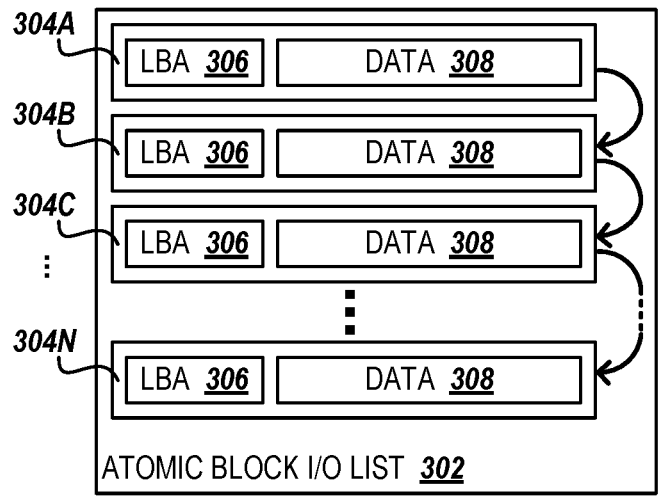
FIG. 3 is a data structure diagram showing an illustrative atomic block I/O list structure containing multiple block I/O write requests, according to embodiments described herein.
Figure 4:
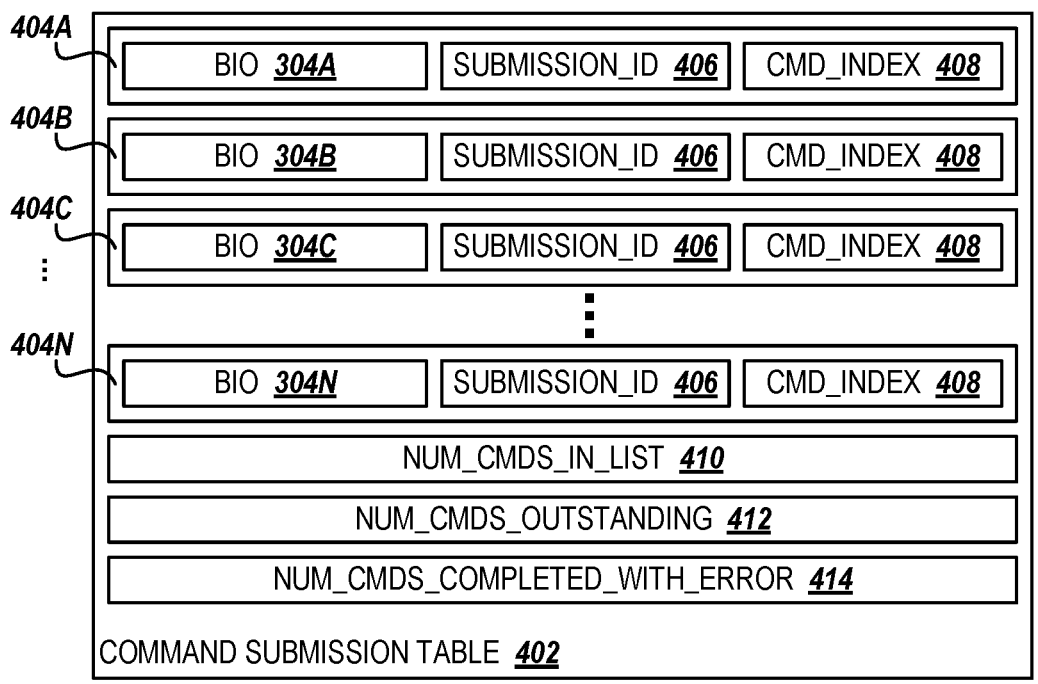
FIG. 4 is a data structure diagram showing an illustrative command submission table structure for tracking submission of the individual block I/O write requests that make up an atomic operation, according to embodiments described herein.
Figure 7:
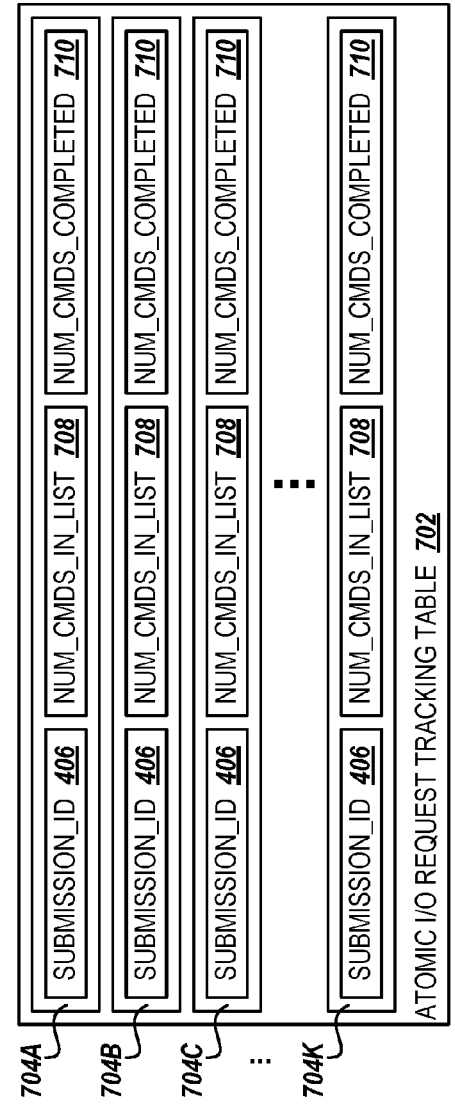
FIG. 7 is a data structure diagram showing an illustrative atomic I/O request tracking table structure for tracking submitted atomic block I/O write requests from a host device, according to embodiments described herein.

FIGS. 3, 4, and 7 are data structure diagrams showing a number of data elements and data structures in computer storage. It will be appreciated by one skilled in the art that data structures shown in the figure may represent instances of objects stored in a computer memory, programmatic structures defined in code, rows in a database table, or any other data container commonly known in the art. Each data element may represent one or more attributes of an object, one or more member variables of a programmatic structure, one or more fields or columns of a database table, a register in a processing unit, or any other unit of data or data structure commonly known in the art. The implementation is a matter of choice, and may depend on the technology, performance, and other requirements of the computing hardware and software architecture in which the data structures and data elements are implemented.

FIG. 3 shows one example of an atomic block I/O request list 302 containing a list of block I/O write requests to be completed as an atomic unit. According to some embodiments, the atomic block I/O request list 302 may be received by the device driver 232 from an application 234 executing on the host device 230. The atomic block I/O request list 302 may comprise a linked list of block I/O ("BIO") write requests 304A-304N (referred to herein generally as BIO write request 304). In some embodiments, each BIO write request 304 comprises a direct I/O write request and includes a logical block address ("LBA") 306 and data 308 to be written to the specified block in the storage device 202. According to embodiments, the LBAs 306 of the various BIO write requests 304 may represent discontiguous blocks on the storage device 202. In further embodiments, the atomic block I/O request list 302 may include an indicator with each BIO write request 304 in the list, such as a "REQ_ATOMIC" flag, indicating that the block I/O write requests are to be executed as an atomic unit. It will be appreciated that the atomic block I/O request list 302 may comprise additional or different elements from those shown in FIG. 3 and described herein.

FIG. 4 shows one example of a command submission table 402 utilized as a tracking structure by the device driver 232 to track the submission of a list of BIO write requests 304A-304N to be completed as an atomic unit to the controller 210 of the storage device 202. In some embodiments, the device driver 232 may maintain an instance of the command submission table 402 for each atomic block I/O request list 302 received from an application 234 or the OS 236 executing on the host device 230. A separate command 404A-404N (referred to herein generally as command 404) may be allocated in the command submission table 402 for each BIO write request 304A-304N in the received list, and the commands 404 may contain the "atomic linkage identifiers" for each BIO write request. For example, all of the BIO write requests 304 in the list may be assigned the same unique submission ID 406, and each BIO write request will further be assigned a command index 408. The submission ID 406 and command index 408 will be submitted to the controller 210 of the storage device 202 with each command 404 corresponding to a BIO write request 304A-304N in the list and may be used to reference the associated command structure within the command submission table 402 in order to track each request.

In addition, the command submission table 402 may include a number of commands in list value 410 representing the count of the BIO write requests 304A-304N in the atomic block I/O request list 302, a number of commands outstanding value 412 representing the number of commands 404 pending with the controller 210, and a number of commands completed with error value 414 representing the number of commands 404 that failed. According to some embodiments, the number of commands outstanding value 412 will initially be equal to the number of commands in list value 410 and is decremented with each command 404 completed by the controller 210. When the number of commands outstanding value 412 reaches zero, if the number of commands completed with error value 414 is not zero, then the request will be completed to the requester with an error. Otherwise, it is completed with success. It will be appreciated that the command submission table 402 may comprise additional or different elements from those shown in FIG. 4 and described herein.

Figure 5:
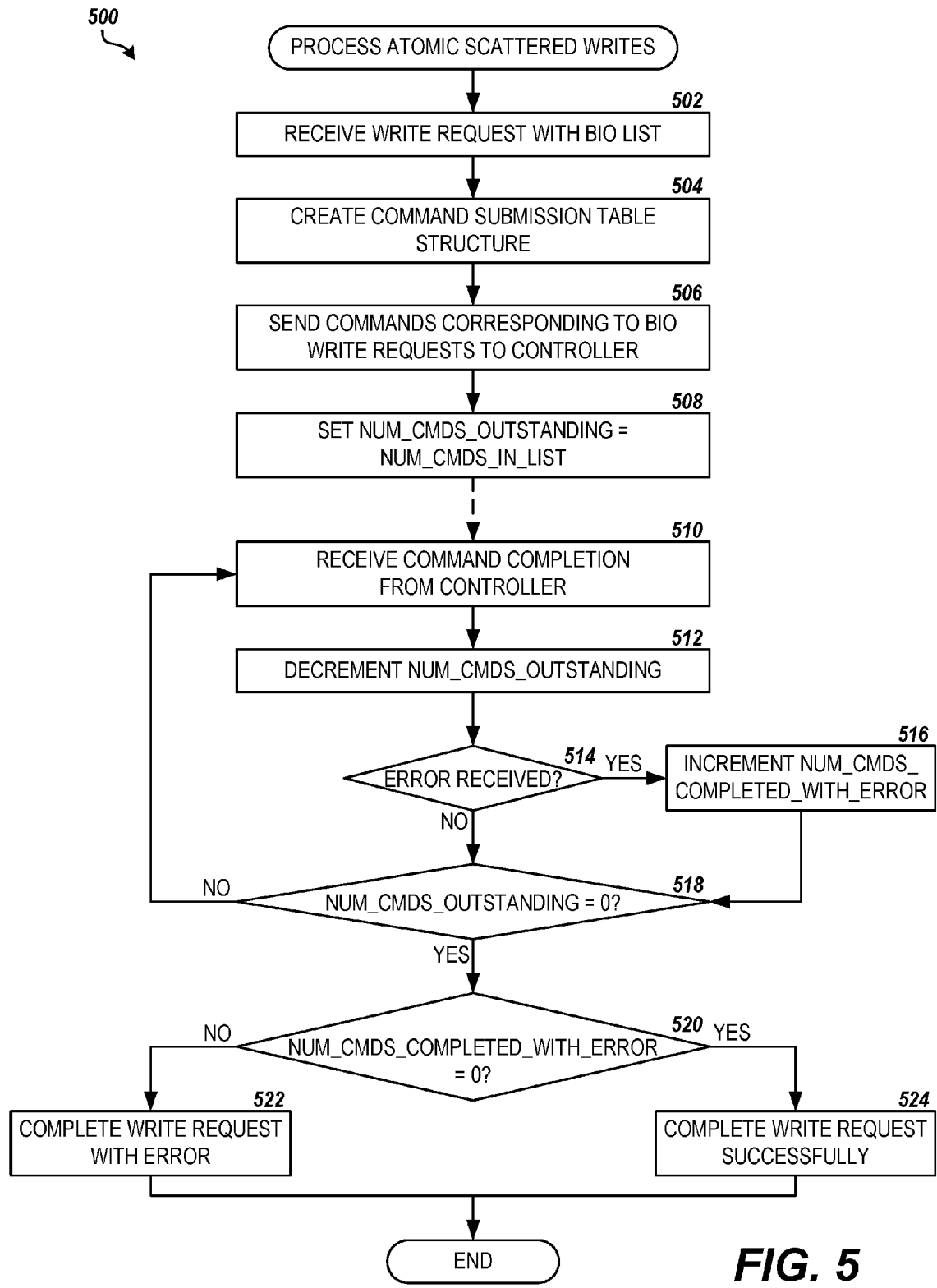
FIG. 5 is a flow diagram showing one method of submitting and tracking the individual block I/O write requests in the atomic operation to a controller of a storage device, according to embodiments described herein.

FIG. 5 illustrates one routine 500 for submitting the individual BIO write requests 304 in the atomic block I/O request list 302 to the controller 210 of the storage device 202 and tracking the status of the requests utilizing the command submission table 402, according to some embodiments. In some embodiments, the routine 500 may be performed by portions of the scattered atomic writing module 240 implemented in the device driver 232 executing on the host device 230, as described herein in regard to FIG. 2. In further embodiments, the routine 500 may be performed by the processor 212 implemented in the controller 210 of the storage device 202, by the host device 230 operably connected to the storage device, or by any combination of these and/or other components, modules, processors, and devices.

The routine 500 begins at step 502, where a scattered atomic write request is received by the scattered atomic writing module 240. According to embodiments, the request comprises an atomic block I/O request list 302 containing a list of BIO write requests 304 to be completed as an atomic unit. In some embodiments, the write request may comprise a series of direct I/O write requests (e.g., targeting a file open with the "O_DIRECT" flag) and further include an indicator, such as a "REQ_ATOMIC" flag, indicating that the write requests are to be executed as an atomic unit.

From step 502, the routine 500 proceeds to step 504, where the scattered atomic writing module 240 creates an instance of the command submission table 402 for the request. In some embodiments, a unique ID value is generated for the request and a command 404 is allocated in the command submission table 402 for each BIO write request 304, with the submission ID 406 set to the generated ID value and the command index 408 set to an index value representing the position of the BIO write request in the list.

The routine 500 proceeds from step 504 to step 506, where the commands 404A-404N corresponding to the BIO write requests 304A-304N are dispatched to the controller 210 of the storage device 202. According to embodiments, each submitted command 404 includes the associated submission ID 406 and command index 408 values from the command submission table 402. In some embodiments, the command 404 may be submitted directly to the controller through the host interface 214. In other embodiments, the communication protocol with the controller 210 may be extended to include the submission ID 406 and command index 408 values. For example, a "RAID_CONTEXT" structure may be defined to include these values in addition to the other elements necessary for submitting each command 404 corresponding to a BIO write request 304 to the controller, as illustrated in the pseudocode below:

```
typedef struct RAID_CONTEXT {
    ...
    U8 cmdIndex;
    U16 submissionID;
};
```

It will be appreciated that due to the asynchronous nature of the host interface 214, the commands 404A-404N may not be submitted to the controller 210 in any particular order. It may, therefore, be necessary to indicate to the controller 210 the number of related write requests that are to be completed as an atomic unit, i.e. the number of commands 404 assigned the same submission ID 406. According to some embodiments, the scattered atomic writing module 240 may set the most significant bit ("MSB") of the command index 408 value for the last command 404N in the list in order to communicate the count of write requests in the atomic unit to the controller 210, as illustrated in the following pseudo code:

```
raidContext.cmdIndex =
commandSubmissionTable.command[N].cmdIndex;
raidContext.submissionID =
commandSubmissionTable.command[N].submissionID;
if (commandSubmissionTable.command[N].cmdIndex ==
    commandSubmissionTable.numCmdsInList) {
    raidContext.cmdIndex | = 0x80;
}
```

Next, as step 508, the scattered atomic writing module 240 sets the number of commands outstanding value 412 in the command submission table 402 equal to the number of commands in list value 410, and the routine 500 proceeds to step 510, where the scattered atomic writing module 240 waits for the controller 210 to complete the submitted commands 404. When a command 404 is completed by the controller 210 to the device driver, the routine 500 proceeds from step 510 to step 512, where the number of commands outstanding value 412 in the command submission table 402 is decremented. In addition, if the command 404 resulted in an error, the number of commands completed with error value 414 in the command submission table 402 is incremented, as shown at steps 514 and 516. The scattered atomic writing module 240 may utilize the submission ID 406 associated with the command 404 to determine the command submission table 402 to be updated, according to some embodiments.

Next, as shown at step 518, the scattered atomic writing module 240 determines whether the number of commands outstanding value 412 is equal to zero. If the number of commands outstanding value 412 is not equal to zero, then the routine 500 returns to step 510, where the scattered atomic writing module 240 waits for the completion of the remainder of the outstanding commands 404 by the controller. If the number of commands outstanding value 412 is equal to zero, the routine 500 proceeds from step 518 to step 520, where the scattered atomic writing module 240 determines whether the number of commands completed with error value 414 is equal to zero. If the number of commands completed with error value 414 is not equal to zero, then the routine 500 proceeds to step 522, where the scattered atomic write request is completed to the requester with an error. Thus if any of the commands 404 corresponding to BIO write requests 304 are completed in error by the controller 210, or any commands timeout or otherwise are not completed successfully, the entire atomic write request is completed to the requester with an error. If the number of commands completed with error value 414 is equal to zero, then the routine 500 proceeds to step 524, where the scattered atomic write request is completed successfully to the requester. From steps 522 or 524, the routine 500 ends.

Figure 6:
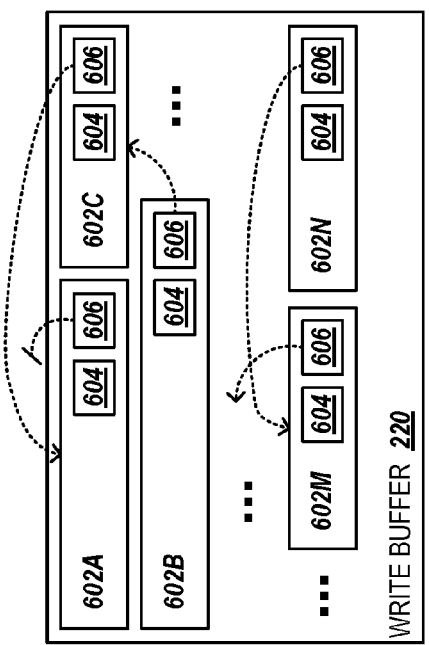
FIG. 6 is a block diagram showing an illustrative write buffer in the controller of a storage device, according to embodiments described herein.

FIG. 6 shows details of an illustrative write buffer 220 in the storage device 202. The write buffer 220 may represent a traditional write cache in an SSD or HDD device, for example. The write buffer 220 may be configured to store multiple buffer entries 602A-602N (referred to herein generally as buffer entry 602) comprising write commands or groups of commands, such as the BIO write requests 304 described herein. According to some embodiments, each buffer entry 602 has an associated DATA_INVALID flag 604. The DATA_INVALID flag 604 allows the controller 210 to prevent flushing of the write command corresponding to the buffer entry 602 to the storage media 204 until the data for the write command has been completely written to the write buffer 220. According to further embodiments, the storage device 202 and the controller 210 may be configured such that once a buffer entry 602 in the write buffer 220 is valid (e.g., the DATA_INVALID flag 604 is cleared), complete writing of the associated data to the storage media 204 is guaranteed.

In some embodiments, each buffer entry 602 may further have an associated previous entry ID 606 identifying the previous buffer entry 602 added to the write buffer for the same submission ID 406. The previous entry ID 606 allows the buffer entries 602 comprising the commands 404 corresponding to related BIO write requests 304 to be linked in a chain so that the controller 210 can quickly traverse the buffer entries 602 to clear the DATA_INVALID flags 604, as is described in more detail herein. It will be appreciated that the DATA_INVALID flag 604 and the previous entry ID 606 associated with each buffer entry 602 may be stored in metadata associated with the write buffer 220, according to some embodiments.

FIG. 7 shows one example of an atomic I/O request tracking table 702 utilized as a tracking structure by the controller 210 to track the various scattered atomic write requests submitted by the device driver 232. The atomic I/O request tracking table 702 may be stored in the memory 218 of the controller 210 of the storage device 202, for example. As discussed above, the controller 210 may recognize a group of submitted commands 404 corresponding to BIO write requests 304 as belonging to the same atomic unit by them having the same submission ID 406. When a command 404 is received from the device driver 232 having a new submission ID 406 value, the controller 210 may create a tracking entry 704A-704K (referred to herein generally as tracking entry 704) in the atomic I/O request tracking table 702 and assign the new tracking entry to the submission ID 406. As may be seen in FIG. 7, the atomic I/O request tracking table 702 may be configured to store some number K of tracking entries 704 in order to handle multiple, concurrent scattered atomic write requests, according to some embodiments.

Each tracking entry 704 may further include a number of commands in list value 708 that indicates the total number of commands 404 submitted that make up the BIO write requests 304 in the atomic unit. According to some embodiments, the controller 210 may determine the number of commands 404 submitted in the atomic unit by checking the MSB of the command index 408 value for each command. When a command 404 is received having a command index 408 with the MSB set, the controller may utilize the value of the command index for that command to set the number of commands in list value 708 for the associated tracking entry 704, as described in more detail herein in regard to FIG. 8.

Each tracking entry 704 may also include a number of commands completed value 710 that indicates that indicates the number of commands 404 associated with the submission ID 406 completed successfully. In some embodiments, the number of commands completed value 710 may be incremented by the controller as each command 404 is added to the write buffer 220. When the number of commands completed value 710 equals the number of commands in list value 708, the controller 210 may clear the DATA_INVALID flags for all of the associated buffer entries 602 causing all of the commands 404 for the atomic unit to be flushed to the storage media 204. It will be appreciated that the atomic I/O request tracking table 702 may comprise additional or different elements from those shown in FIG. 7 and described herein.

Figure 8:
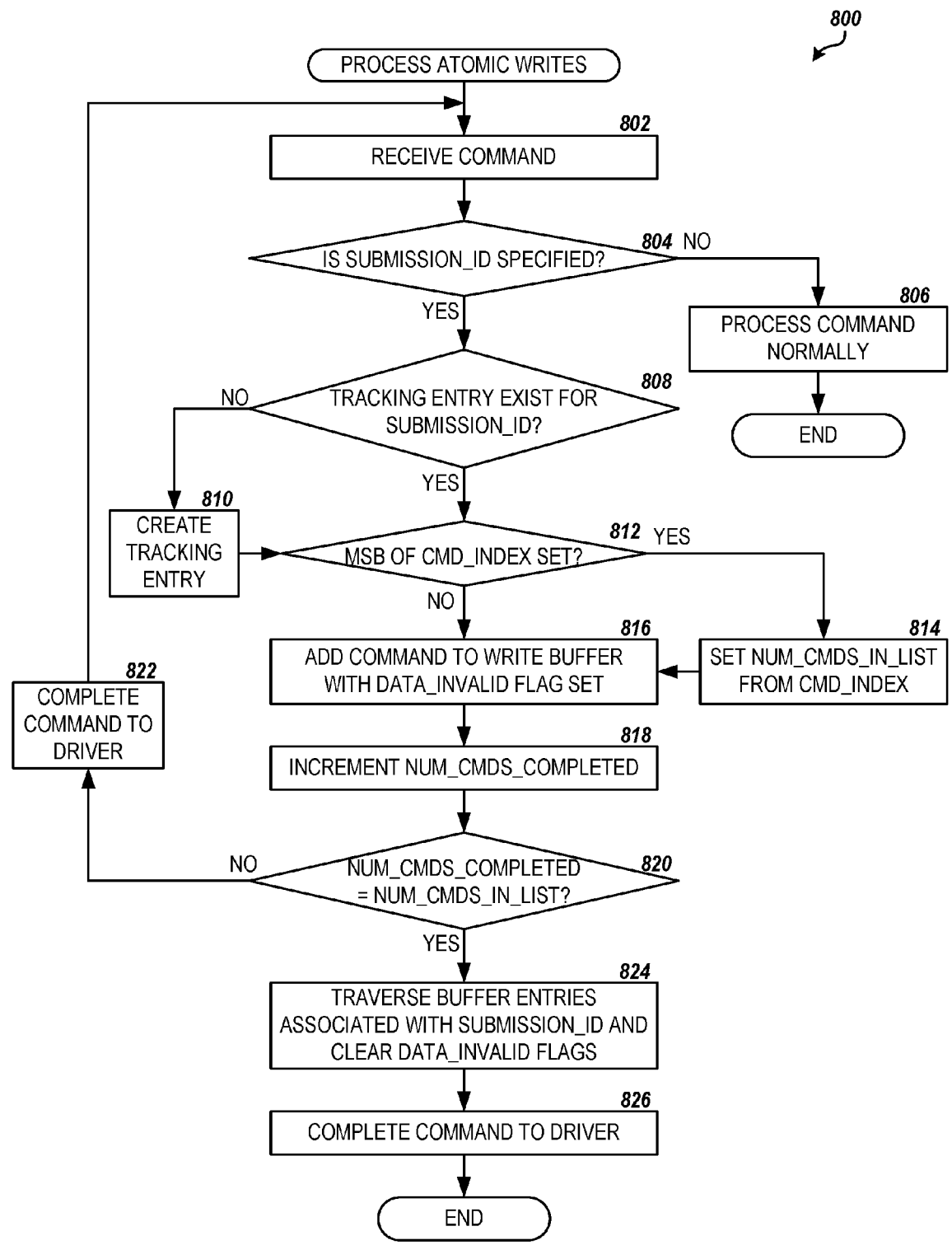
FIG. 8 is a flow diagram showing one method of processing a group of related block I/O write requests in an atomic fashion using a write buffer of the storage device, according to embodiments described herein.

FIG. 8 illustrates one routine 800 for processing a group of related commands 404 corresponding to a list of BIO write requests 304 in an atomic fashion using a write buffer 220 of the storage device 202, according to some embodiments. In some embodiments, the routine 800 may be performed by portions of the scattered atomic writing module 240 implemented in the controller 210, as described above in regard to FIG. 2. In further embodiments, the routine 800 may be performed by the processor 212 implemented in the controller 210 of the storage device 202, by the host device 230 operably connected to the storage device, or by any combination of these and/or other components, modules, processors, and devices.

The routine 800 begins at step 802, where a command 404 is received. According to some embodiments, the command 404 may be received from the device driver 232 executing on a host device 230 connected to the storage device 202. From step 802, the routine 800 proceeds to step 804, where the scattered atomic writing module 240 determines if a submission ID 406 was submitted with the command 404. If no submission ID 406 was specified (e.g., submission ID=0 or NULL), then the routine 800 proceeds to step 806, where the controller 210 may process the command 404 normally as it is not associated with a list of related BI write requests 304 to be completed as an atomic unit. From step 806, the routine 800 ends.

If a submission ID 406 was specified with the command 404 (e.g., in the raidContext structure), then the routine 800 proceeds from step 804 to step 808, where the scattered atomic writing module 240 determines if a tracking entry 704 exists in the atomic I/O request tracking table 702 for the submission ID 406. If no tracking entry 704 associated with the value of the specified submission ID 406 exists, then the scattered atomic writing module 240 creates a tracking entry in the atomic I/O request tracking table 702 and assigns it to the submission ID, as shown at step 810.

Next, at step 812, the scattered atomic writing module 240 determines whether the MSB of the specified command index 408 is set, indicating that the command 404N corresponds to the last BIO write request 304N in the list. If the MSB of the command index 408 is set, then the routine 800 proceeds from step 812 to step 814, where the scattered atomic writing module 240 sets the number of commands in list value 708 in the tracking entry 704 associated with the submission ID 406 from the specified value of the command index 408. For example, the scattered atomic writing module 240 may implement a routine illustrated by the following pseudocode:

```
isLastCmd = raidContext.cmdIndex & 0x80;
cmdIndexVal = raidContext.cmdIndex & 0x7F;
if (isLastCmd) {
    trackingEntry.numCmdsInList = cmdIndexValue;
}
```

Next, the routine 800 proceeds to step 816, where the scattered atomic writing module 240 adds the command 404 to the write buffer 220. According to embodiments, the scattered atomic writing module 240 sets the DATA_INVALID flag 604 associated with the newly added buffer entry 602 indicating that the buffered write command is not to be flushed to the storage media 204. In further embodiments, the scattered atomic writing module 240 may further set the previous entry ID 606 associated with the buffer entry 602 to point to the previous buffer entry associated with the same submission ID 406. The scattered atomic writing module 240 may track the identifier of the last buffer entry 602 added for each submission ID 406 in the corresponding tracking entry 704 in the atomic I/O request tracking table 702, for example, in order to maintain a chain of commands 404A-404N corresponding to related BIO write requests 304A-304N in the write buffer 220.

From step 816, the routine 800 proceeds to step 818, where the scattered atomic writing module 240 increments the number of commands completed value 710 in the tracking entry 704 associated with the submission ID 406. Next, at step 820, the scattered atomic writing module 240 determines whether the number of commands completed value 710 equals the number of commands in list value 708 in the tracking entry 704. If the number of commands completed value 710 does not equal the number of commands in list value 708, then the routine 800 proceeds from step 820 to step 822, where the scattered atomic writing module 240 completes the command 404 to the driver as successful. The routine then returns to step 802, where the scattered atomic writing module 240 waits for the next command 404 from the driver.

If the number of commands completed value 710 equals the number of commands in list value 708, then the routine 800 proceeds from step 820 to step 824, where the scattered atomic writing module 240 clears the associated DATA_INVALID flags 604 for all of the buffer entries 602A-602N in the write buffer 220 associated with the submission ID 406, causing all of the commands 404-404N corresponding to the BIO write requests 304A-304N for the atomic unit to be flushed to the storage media 204. According to some embodiments, the scattered atomic writing module 240 may utilize the previous entry ID 606 associated with each buffer entry 602, starting with the newly added buffer entry, to traverse all entries related to the atomic unit and clear the DATA_INVALID flags 604. The routine 800 proceeds from step 824 to step 826, where the scattered atomic writing module 240 completes the last command 404 to the device driver 232 successfully. From step 826, the routine 800 ends.

Based on the foregoing, it will be appreciated that technologies for implementing scattered atomic I/O writes in a storage device are presented herein. While embodiments are described herein in regard to an SSD or HDD device, it will be appreciated that the embodiments described in this disclosure may be utilized in any storage device incorporating a write buffer or write cache and configured to guarantee atomicity for a single I/O write to a contiguous range of blocks, including but not limited to, magnetic disk drives, hybrid magnetic and solid state drives, optical disk storage devices, and the like. Additionally, while various components and steps are described as residing and/or executing in a device driver executing on a host device or in the controller of a storage device, it will be appreciated that the components and steps may reside and/or execute solely in the controller, solely on the host device, or be distributed between the host device and the controller in any combination. The above-described embodiments are merely possible examples of implementations set forth for a clear understanding of the principles of the present disclosure.

The logical steps, functions or operations described herein as part of a routine, method or process may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which steps, operations or functions may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method comprising steps of:
    receiving a list of block I/O write requests to be completed as an atomic unit from a requester, the list of block I/O write requests specifying a plurality of block I/O writes with at least two of the plurality of block I/O writes specifying discontiguous data locations on a storage media of a storage device;
    storing a buffer entry in a memory of the storage device for each of the plurality of block I/O writes while marking the buffer entry corresponding to each of the plurality of block I/O writes as having an invalid state, wherein marking a buffer entry as having an invalid state prevents the associated block I/O write from being flushed from the memory to the storage media, each buffer entry comprising a link to at least one other buffer entry corresponding to one of the plurality of block I/O writes;
    upon buffering all of the plurality of block I/O writes, traversing the buffer entries in the memory corresponding to the plurality of block I/O writes based on the links between the buffer entries and mark each buffer entry as having a valid state, wherein marking a buffer entry as having a valid state causes the associated block I/O write to be eligible to be flushed from the memory to the storage media; and
    upon marking the buffer entries corresponding to the plurality of block I/O writes as having a valid state, acknowledge successful completion of the list of block I/O write requests to the requester.

2. The method of claim 1, wherein receiving the list of block I/O write requests is performed by a device driver on a host computer and wherein buffering each of the plurality of the block I/O writes is performed by a controller of the storage device operably connected to the host computer.

3. The method of claim 2, further comprising steps of:
    upon receiving the list of block I/O write requests to be completed as an atomic unit from the requester, creating by the device driver a tracking structure for the list of block I/O write requests to track a progress of submission of each of the plurality of block I/O writes to the controller of the storage device.

4. The method of claim 1, wherein the storage device comprises a solid-state drive ("SSD") device.

5. The method of claim 1, wherein the storage device comprises a hard disk drive ("HDD") device.

6. The method of claim 1, further comprising steps of:
    upon receiving the list of block I/O write requests, assigning atomic linkage identifiers to each of the block I/O writes.

7. The method of claim 6, wherein the atomic linkage identifiers comprise a same submission index value assigned to all of the block I/O writes and a separate command index value assigned to each of the block I/O writes.

8. The method of claim 1, wherein a data invalid flag is associated with each buffer entry, and wherein marking the buffer entry corresponding to each of the plurality of block I/O writes as having an invalid state comprises setting the data invalid flag associated with the buffer entry.

9. The method of claim 8, wherein a previous entry ID is associated with each buffer entry, and wherein marking the buffer entries corresponding to each of the plurality of block I/O writes as having a valid state comprises traversing the buffer entries based on the associated previous entry ID and clearing the associated data invalid flag.

10. The method of claim 1, wherein the request comprises a direct I/O write request from an application executing on a host computer to a device driver executing on the host computer.

11. The method of claim 10, wherein the application comprises a database management system and wherein the request comprises a data file write request.

12. A non-transitory computer-readable medium containing processor-executable instructions that, when executed by a processor of a host device, cause the processor to:
receive a list of block I/O write requests to be completed as an atomic unit from a requester, the list of block I/O write requests specifying a plurality of block I/O writes with at least two of the plurality of block I/O writes specifying discontiguous data locations on a storage media of a storage device operably connected to the host device;
generate atomic linkage identifiers for each of the plurality of block I/O writes associating the block I/O write with the list of block I/O write requests;
submit each of the plurality of block I/O writes with the generated atomic linkage identifiers to a controller of the storage device, the controller configured to, upon receiving a submitted block I/O write, store a buffer entry for the submitted block I/O write in a memory of the storage device, the buffer entry comprising a link to at least one other buffer entry corresponding to one of the plurality of block I/O writes, while marking the buffer entry as having an invalid state preventing the corresponding block I/O write from being flushed from the memory to the storage media, and, upon successfully buffering of the submitted block I/O write, complete the submitted block I/O write to the processor successfully, the controller further configured to, upon buffering the last of the submitted block I/O writes associated with the list of block I/O write requests based on the atomic linkage identifiers, traverse the buffer entries corresponding to the plurality of block I/O writes associated with the list of block I/O write requests based on the links between the buffer entries and mark each buffer entry as having a valid state causing the corresponding block I/O write to be eligible to be flushed from the memory to the storage media;
upon receiving completion of a last of the submitted block I/O writes from the controller, determine whether any of the submitted block I/O writes were completed by the controller with an error;
if any of the submitted block I/O writes were completed by the controller with an error, complete the list of block I/O write requests to the requester with an error; and
if all of the submitted block I/O writes were completed by the controller successfully, acknowledge successful completion of the list of block I/O write requests to the requester.

13. The non-transitory computer-readable medium of claim 12, wherein the processor-executable instructions comprise a device driver module associated with the storage device.

14. The non-transitory computer-readable medium of claim 12, containing further processor-executable instructions that cause the processor to:
upon receiving the list of block I/O write requests to be completed as an atomic unit from the requester, create a tracking structure for the list of block I/O write requests to track a progress of the submission of each of the plurality of block I/O writes to the controller of the storage device.

15. The non-transitory computer-readable medium of claim 12, wherein the atomic linkage identifiers comprise a same submission index value assigned to all of the block I/O writes and a separate command index value assigned to each of the block I/O writes.

16. A system for storing data comprising:
a storage device comprising storage media;
a write buffer for temporarily storing block I/O write requests received for the storage device before flushing to the storage media, the write buffer stored in a memory of the storage device distinct from the storage media; and
a controller for processing the block I/O write requests, the controller configured to
receive a block I/O write request,
determine whether the block I/O write request is associated with a list of block I/O write requests to be completed as an atomic unit based on atomic linkage identifiers associated with the block I/O write request,
buffer the block I/O write request in the write buffer while marking a buffer entry corresponding to the block I/O write request as having an invalid state, the buffer entry comprising a link to at least one other buffer entry associated with the list of block I/O write requests, wherein marking a buffer entry as having an invalid state prevents the corresponding block I/O write request from being flushed from the write buffer to the storage media, and
upon buffering a last of the block I/O write requests associated with the list of block I/O write requests based on the atomic linkage identifiers, traverse the buffer entries associated with the list of block I/O write requests based on the links between the buffer entries and marking each buffer entry as having a valid state, wherein marking a buffer entry as having a valid state causes the associated block I/O write requests to be eligible to be flushed from the write buffer to the storage media.

17. The system of claim 16, wherein the block I/O write request is received from a device driver executing on an operably connected host device, and wherein the atomic linkage identifiers comprise a same submission index value assigned to all of the block I/O write requests associated with the list of block I/O write requests to be completed as an atomic unit and a separate command index value assigned to each individual block I/O write request.

18. The system of claim 16, wherein the controller is further configure to:
upon determining that the block I/O write request is associated with the list of block I/O write requests to be completed as an atomic, determine whether a tracking entry associated with the list of block I/O write requests exists in a tracking structure based on the atomic linkage identifiers; and
upon determining that a tracking entry associated with the list of block I/O write requests does not exist, create a tracking entry in the tracking structure and associate the created tracking entry with the list of block I/O write requests based on the atomic linkage identifiers.

19. The system of claim 16, wherein the storage device comprises a hard disk drive ("HDD") device.

\* \* \* \* \*